July 30, 1929.　　　A. MOORHOUSE　　　1,722,335
INTERNAL COMBUSTION ENGINE
Filed Dec. 26, 1924
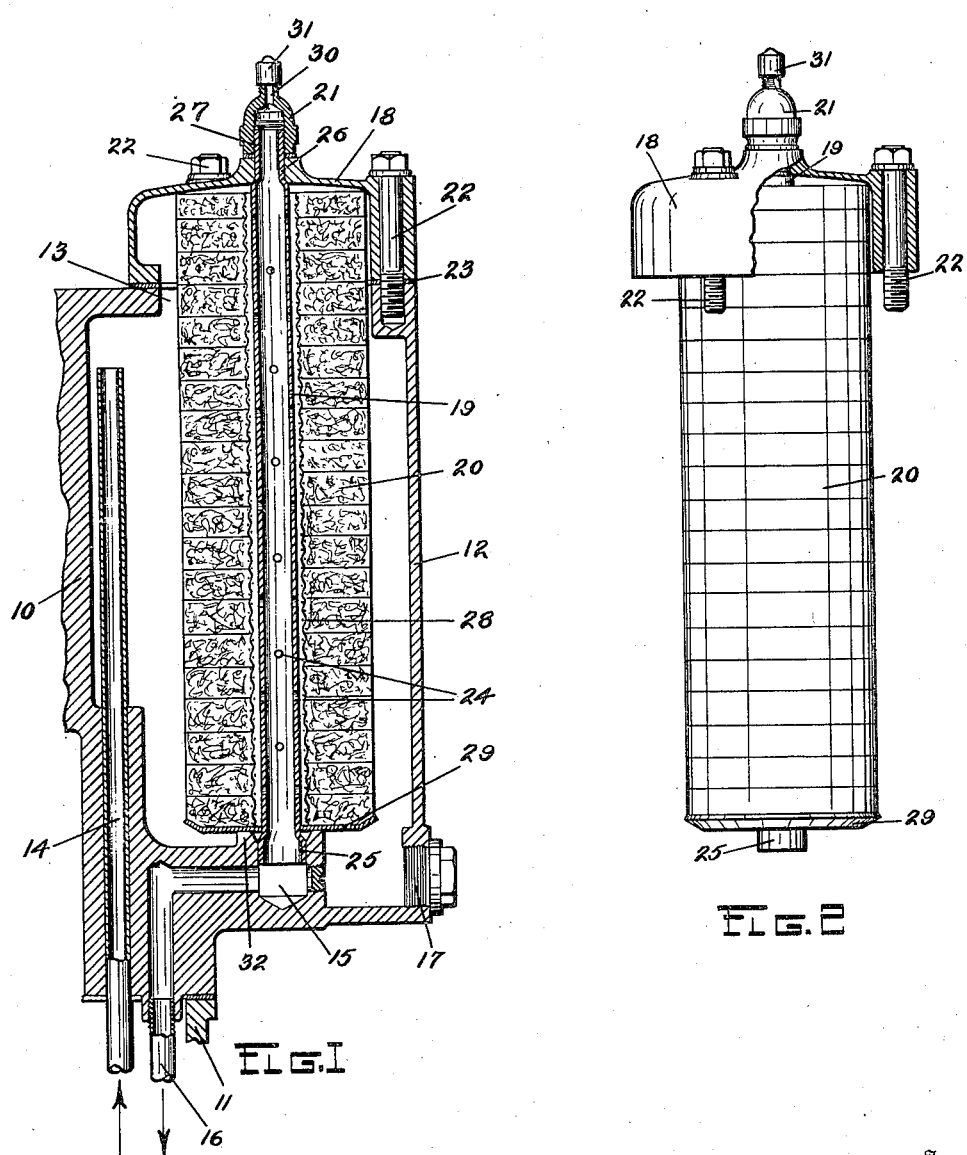
Inventor
Alfred Moorhouse Patented July 30, 1929.

1,722,335

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

INTERNAL-COMBUSTION ENGINE.

Application filed December 26, 1924. Serial No. 758,042.

This invention relates to internal combustion engines and more particularly to filter mechanism therefor.

One of the objects of the invention is to provide a novel form of filter mechanism that may be used for filtering the oil of the lubrication system of an internal combustion engine.

Another object of the invention is to provide a filter mechanism with a filter unit that may be assembled independently of the casing and then inserted into the casing as a unit.

Another object of the invention is to provide a filter means in which a filter unit may be assembled with the filter material in partly compressed condition and in which the filter material may be further compressed as the unit is connected to the filter casing.

Other objects and advantages of the invention will appear from the following description taken in connection with the drawing which forms a part of this specification, and in which:

Fig. 1 is a section through a filter mechanism embodying the invention, and

Fig. 2 is an elevation view of the filter unit separated from the casing.

Referring to the drawing, the side 10 of the crankcase of an internal combustion engine includes the lower detachable part 11 in which is usually located the oil sump and the pump for withdrawing the oil from the sump and forcing it to the bearings of the engine. The crankcase 10 is shown as forming a casing 12 which is the filter casing of this invention. This casing is preferably substantially cylindrical in form and somewhat elongated vertically with an opening 13 at its upper end for inserting and withdrawing the filter unit hereinafter described. The casing also has an inlet pipe 14 which connects with the force pump and an outlet 15 which connects by a pipe 16 with the bearings or other parts of the engine to be lubricated. The casing also has a plugged opening 17 at its lower end for cleaning purposes.

It is one of the features of this invention that the filter unit may be assembled separately from the casing 12 and then readily inserted in the casing and secured to it by simply bolting it in place. This unit comprises a cover 18 which is adapted to cover the opening 13, a tube 19, a filter pack or column of filter material 20, and a nut or cap 21 for securing the tube and the filter material and the cover. Bolts 22 are provided for securing the cover 18 to the casing 12, and a gasket 23 is provided between the cover and the casing to make a tight joint.

The tube 19 is perforated as shown at 24, is enlarged slightly at its lower end, as at 25 so that it has a sliding fit with the outlet opening 15 above referred to, is made with a smaller neck 26 which extends through an opening in the center of the cover 18, and is threaded into the cap or nut 21 as shown at 27. The filter pack 20 is shown as comprising a series of hollow disks of filter material such as felt and a wire tube 28 is preferably provided between the tube and the filter pack to hold the latter slightly away from the tube 19 and thereby support the filter pack in position. A metal disk 29 is arranged at the lower end of the filter pack and the opening in this disk is smaller than the enlarged end 25 of the tube 19 so that the filter pack 20 may be somewhat compressed between the disk 29 and the cover 18. This compression of the filter pack is accomplished by the cap 21 when it is screwed onto the threaded end of the tube 19, the distance between the cover 18 and the disk 29 being thereby shortened.

The cap 21 is preferably perforated as at 30 and threaded on the outside so that an air hose may be connected to it for cleaning out the filter. When the air hose is connected, the plugged opening 17 is opened so that the dirt will be blown out of the filter casing. A small threaded cap 31 is screwed on over the end of the nut 21 to normally close the opening 30.

In Fig. 2 the filter element is shown in an assembled condition and ready to be inserted into the casing 12. As it is inserted in the casing, the lower end 25 of the tube 19 slides into the outlet opening 15 and the disk 29 rests against a boss 32 surrounding the outlet opening 15. The cover 18 is then directly over the opening 13 and the bolts 22 are positioned for threading into the corresponding threaded recesses in the casing 12. As the bolts 22 are tightened to secure the cover 18 in place, the filter pack 20 is further compressed by reason of the tube 19 pushing down into the opening 15 and the boss 32 preventing the further downward movement of the disk 29. The filter pack is, of course, disassembled by reversing the operation described above.

It will be understood that the oil is pumped through the inlet pipe 14 to the casing 12 under pressure, that it is forced through the filter material 20, passes through the wire tube 28 and through the openings 24 in the tube 19. The interior of the tube 19 connects with the outlet 15 and consequently the filtered oil flows from the tube into the outlet 15 and to the pipe 16 which leads to the bearings of the engine.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What is claimed is:

1. In a filter mechanism, in combination, a casing having an inlet and an outlet and an opening for inserting filter material, a cover for the casing opening, a tube secured to the cover, a shoulder on said tube adapted to engage said cover, filter material surrounding the tube, means on the tube for compressing the filter material and means connecting the tube with the casing outlet when the cover is secured over the casing opening.

2. In a filter, in combination, a casing having an opening therein, a cover for the opening, filter material secured to the cover and adapted to be inserted through said opening, means on the tube for compressing the filter material before insertion and means for compressing the filter material as the cover is secured in place over the opening.

3. In a filter mechanism, in combination, a casing including an outlet opening, a tube adapted to slide into said outlet opening in said casing, a cover connected to said tube, means for simultaneously securing the cover in place and the tube end in engagement with said outlet opening, filter material surrounding said tube and means on said tube for compressing said filter material.

4. In a filter mechanism, in combination, a casing, and a filter unit adapted to be inserted in said casing, said unit comprising a cover, a perforated tube extending through said cover, a threaded cap adapted to draw the end of said tube through said cover, and filter material surrounding said tube and adapted to be somewhat compressed as the tube is connected to the cover.

5. In a filter, a tube having one end enlarged and another end reduced, a casing having an outlet opening engaging said enlarged end, a cover having an opening engaging said reduced end, a disk mounted on and movable along said tube, and filter material adapted to be retained between said disk and said cover.

6. A filter comprising a casing and a filter unit adaptable for insertion in the casing including a perforated tube, a filter pack on the tube, means associated with the tube for compressing the filter pack before insertion of the unit in the casing and means for compressing the filter pack after insertion in the casing.

7. A filter comprising a perforated tube, a disk slidable on the tube, a cover slidable on the tube, a filter pack on the tube intermediate the disk and cover, means on the tube for compressing the filter pack between the disk and cover, said means having an opening communicating with the tube and means for closing said opening.

8. A filter comprising a casing having an outlet in one end thereof and an opening in the other end, a cover for the casing having an opening concentric to the outlet, a perforated tube having an enlarged end adaptable for engaging the outlet in the casing and a reduced end adaptable for engaging the opening in the cover, a disk slidable on the tube, a filter pack on the tube intermediate the disk and the cover, means on the tube for compressing the filter pack having an opening communicating with the end of the tube, means for further compressing the filter pack upon securing the cover in position on the casing and means for closing the opening in the compression means.

In testimony whereof I affix my signature.

ALFRED MOORHOUSE.